(12) United States Patent
Kristiansen

(10) Patent No.: US 7,530,318 B2
(45) Date of Patent: May 12, 2009

(54) METHOD AND SYSTEM FOR PRODUCING A POTENTIAL OVER A BODY

(76) Inventor: Arne Kristiansen, Einervelen 61, Langhus (NO) N-1405

(*) Notice: Subject to any disclaimer, the term of this patent is extended or adjusted under 35 U.S.C. 154(b) by 172 days.

(21) Appl. No.: 10/496,494

(22) PCT Filed: Nov. 29, 2002

(86) PCT No.: PCT/NO02/00457
§ 371 (c)(1),
(2), (4) Date: Jul. 28, 2004

(87) PCT Pub. No.: WO03/045778
PCT Pub. Date: Jun. 5, 2003

(65) Prior Publication Data
US 2005/0109880 A1    May 26, 2005

(30) Foreign Application Priority Data
Nov. 30, 2001    (NO) .................................. 20015844

(51) Int. Cl.
*B63B 1/34* (2006.01)
(52) U.S. Cl. .................. 114/67 A; 114/140; 114/151
(58) Field of Classification Search .................. 244/204, 244/207, 198; 114/150, 151, 162, 278, 140, 114/67 A
See application file for complete search history.

(56) References Cited

U.S. PATENT DOCUMENTS

| 1,999,255 A | * | 4/1935 | Rank | ............................. | 440/40 |
| 2,108,652 A | * | 2/1938 | Coanda | ...................... | 244/73 B |

(Continued)

FOREIGN PATENT DOCUMENTS

| GB | 780381 | 7/1957 |

(Continued)

OTHER PUBLICATIONS

Daniel Bernouli, "Hydrodynamica", 1738, p. 291

(Continued)

*Primary Examiner*—Timothy D Collins
(74) *Attorney, Agent, or Firm*—Christian D. Abel

(57) ABSTRACT

This application concerns a method and system using a hydrodynamical effect for producing a potential over a body. The force obtained this way is useful for the propulsion and maneuvering of ships, submarines, aeroplanes, and airships. A body immersed in a fluid at rest is subject to equal pressures on all sides. A stream close to one side of the body will reduce the local pressure and produce a potential over the body. This is currently done by moving the body in the fluid, cf. aeroplane wings. The potential may be produced by setting up a stream or streams over one side of the body. Bodies attached to aeroplanes by hinges are useful for their lift, propulsion and maneuvering, and will make them independent of velocity for lift and maneuvering. The same will be the case for submarines. Airships and seagoing vessels may be designed so as to have their propulsive bodies integrated in their form. The streams are produced from nozzles, holes, or slits in tubes placed near the stagnation line of each body, thus defining its leading edge. Used on a ship, this technique lowers its bow wave and removes the dynamical losses connected with screw propulsion. The maneuvering force and precision are enhanced.

5 Claims, 1 Drawing Sheet

U.S. PATENT DOCUMENTS

| | | | | |
|---|---|---|---|---|
| 3,472,470 | A | * | 10/1969 | Pauli .................... 244/76 R |
| 3,779,199 | A | * | 12/1973 | Mayer ........................ 440/38 |
| 5,755,408 | A | * | 5/1998 | Schmidt et al. ............ 244/204 |
| 6,105,904 | A | * | 8/2000 | Lisy et al. ................ 244/200.1 |
| 6,113,036 | A | * | 9/2000 | deGraffenried ............ 244/207 |
| 6,994,297 | B1 | * | 2/2006 | Hassan et al. .............. 244/204 |
| 2003/0201363 | A1 | * | 10/2003 | Carr ............................ 244/74 |

FOREIGN PATENT DOCUMENTS

| | | |
|---|---|---|
| GB | 2236293 | 4/1991 |
| GB | 2318558 | 4/1998 |
| JP | 2000 142575 | 3/2000 |
| JP | 2002097651 | 4/2002 |
| NO | 143093 | 9/1980 |
| NO | 905214 | 11/1990 |
| NO | 905215 | 11/1990 |
| NO | 305769 | 11/1998 |

OTHER PUBLICATIONS

Su. AA, "Harvald, Resistance & Propulsion of Ships", 1983, p. IX-XI, 104, 118, 127, 216-218.

B.S. Massey, "Mechanics of Fluids", 1970 p. 79-84.

T. Mehus, "An Experimental Investigation into the Shape of Thrust Augmenting Surfaces in Conjunction with Coanda -Deflected Jet Sheets", 1965.

Harald Walderhaug, "Inutstand og Framdrift", 1988, p. 2.

S.W. Yuan, "Foundation of Fluid Mechanics", 1970, p. 150-156, 408-410, 435-443.

"Blown surfaces", http://travel.howstuffworks.com/airplane 16.htm.

Kelly, Andersen & Innis, "Blowing-type boundry-layer control as applied to the trailing-edge flaps of 35 degree swept wing airplane", NANA Ames.

Aeronautical Laboratory, NACA Report 1369, 23 pp, 1958 see http://naca.larc.nasa.gov/reports/1958/naca-report-1369/.

"The General History Behind the F-104" See http://www.landspeed.com/104history.asp.

Cortelezzi, Lee, Kim & Speyer, "Skin-Friction Drag Reduction Via Robust Reduced-Order Linear Feedback Control", Int. Jrnl of Computational.

Fluid Dynamics 1998, vol. 1, No. 1-2, 79-92.

Bamber, "Preliminary investigationon boundary layer control by means of suction and pressure with the USA 27 airfoil", NACA TN-286, May 1928.

See: http:// naca.larc.nasa.gov/reports/1928/naca-tn-286/naca-tn-286.pdf.

Office Action of Sep. 14, 2006, Russian Patent Office.

* cited by examiner

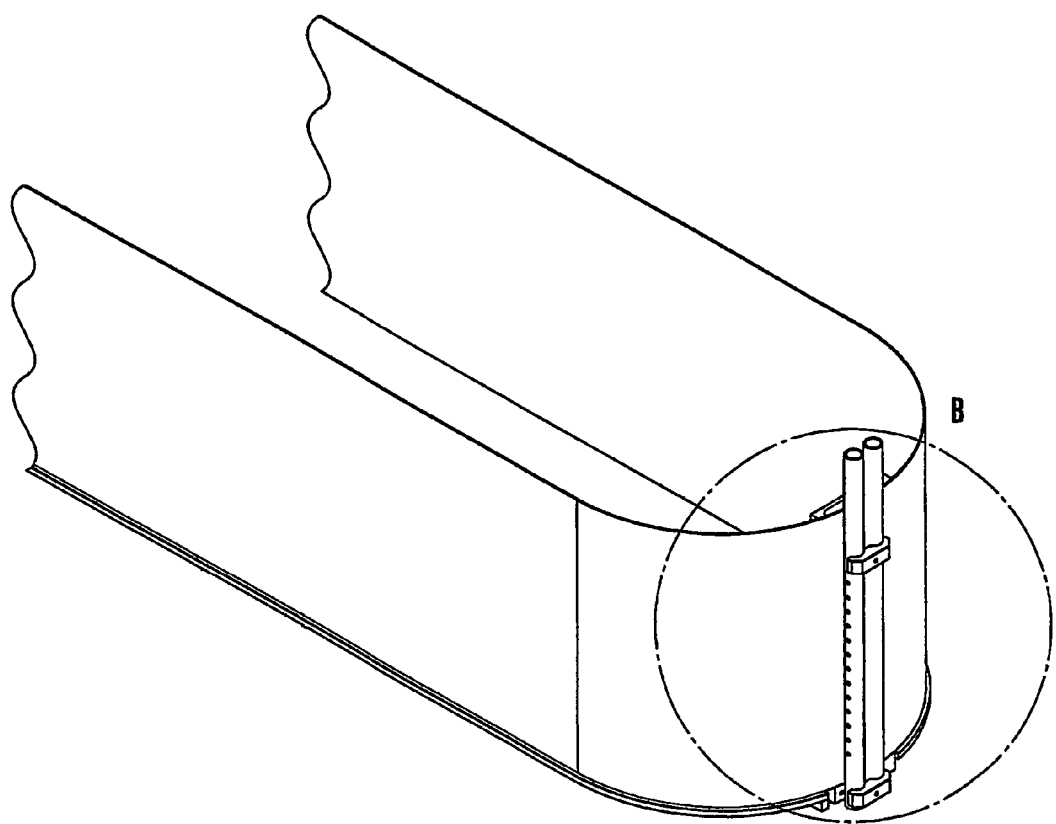

METHOD AND SYSTEM FOR PRODUCING A POTENTIAL OVER A BODY

This application concerns a method and system using a hydrodynamical effect for producing a potential over a body. The force obtained this way is useful for the propulsion and maneuvering of ships, submarines, aeroplanes, and airships.

I. General.

Hydrodynamics concerns the relation of forces between a stream of fluid and its neighbouring fluid or body. A stream will transmit a force according to its velocity and mass density.

In a stream or at its periphery, the pressure is reduced so that the total energy of the stream and its ambient fluid is unaltered. This principle was described by D. Bernoulli (1).

The energy of a stream is equivalent to the potential of a static pressure differential. The pressure is measured in pascal; and the energy of the stream is ½ $\rho v^2$, also Pa. Their equivalence is seen in $Pa=Nm^{-2}=Jm^{-3}=W/m^3 s^{-1}$. The hydrodynamical effect is a function of the mass density of the fluid and the square of its velocity.

A stream may be seen as a pressure vector. From it, a pressure differential is transmitted normally to the direction of the stream, producing a force, cf. $\nabla \times E = -\partial B/\partial t$ (J. C. Maxwell). A measure of the energy exchange of the vector is taken as the integral of the interaction over a given time.

The hydrodynamical principle is distinguished from the kinetic principle described in Newton's three laws. In the use of fluid mechanics for technical applications, the different nature of these two principles should be kept in mind, as they set different constraints and lead to different technical consequences. The physical functions and technical details of kinetic technology should be kept conceptually apart from each other, and from those of hydrodynamical technology.

The force obtained by a reaction device is the product of an accelerated mass: $F=m \cdot a$, or the product of the quantity of mass per unit of time and its velocity: $F=m \cdot t^{-1} \cdot v$.

The force obtained by the pressure differential of a stream is the difference of pressure relative to the undisturbed fluid times the area of the surface over which it works. Here, the mass density p of the fluid is a factor: $F=\Delta p \cdot A$; or $F=½\rho \cdot v^2 \cdot A$. The hydrodynamical force is a function of the square of velocity of the stream.

Oars and caudal fins are reaction devices. For the tecnical use of fluid kinetics, an axially mounted reaction device is needed in order to absorb the propulsive momentum. It will be a propeller, rocket, nozzle, or jet engine.

Where a stream is used for producing a momentum by reducing the pressure of its ambient fluid, it is not useful for producing a reactive force, as the directions of those two are normal to each other.

The lifting force of an aeroplane wing is produced by its splitting the meeting air and thus setting up two streams by its movement. As the streams follow the two sides of the wing, they get different courses and velocities. The wing is lifted by the differential of the transversal forces of the streams, which, because of the speed of the aeroplane, is a relatively small differential of considerably reduced pressure, as the pressure side and the suction side are both exposed to a high air velocity.

A part of the lifting force of the wing is kinetic, produced by the vertical component of the stream induced by the angle of attack of the wing, cf. the sinking of a glider.

Passenger aeroplanes illustrate the lower need for power in the technical use of hydrodynamics compared to that of kinetics. At the start, their propulsive force is around 40 per cent of what would have been needed as a vertical reactive force in order to lift the aeroplane against the acceleration of gravity, cf. Newton's third law. Cruising at a height of 11,000 m, the propulsive force of the aeroplane equals less than 25 per cent of the vertical reactive force needed. This does not imply that Newton's third law be invalidated. Hydrodynamics is, though, not what it is intended to describe. Hydrodynamical forces are not adequately described nor calculated within the models belonging to the kinetic part of fluid mechanics.

The force obtained by this principle used in the present technique is currently calculated by the circulation model, as the reactive force to the centripetal force $mv^2/R$, or by the equation describing the principle of Bernoulli. These three are models, i.e. tools for calculation, while Bernoulli's equation is also a theory, i.e. a postulate concerning specific properties of reality.

The principle is referred to in a Norwegian application for patent (3); and it is the functional principle of a patented device (8). In practised technology, it constitutes a part of the function of aeroplane wings.

The application of this principle is known from an experiment with the purpose of augmenting the lift of aeroplanes at low speed. Using an oblong nozzle, an added stream was drawn in between the nozzle and the surface blown. Compared to the reactive force of the stream, a thrust augmentation of 1-37 was attained (5). This device is, however, not optimal, as a higher efficiency is achieved when the stream has its highest velocity close to the surface, cf. the aeroplane wing. By the same way of calculation, a passenger aeroplane has a thrust augmentation of 2-5-4.

An optimal conversion of energy for a technical purpose presupposes that the different functions of the physical variables are separated within the apparatus. This is what is seen in Watt's placing the condenser outside the cylinder of the steam engine; and it is the principle applied when the pressure of an combustion motor is converted through a pump into pressure in a fluid.

Instead of producing the stream differential passively by moving the body in the fluid, it is possible to produce it actively by moving the fluid over the body. It is then possible to produce the potential by setting up a stream over one side of the body only. In this lies the reason for applying the hydrodynamical principle to marine purposes and for designing aeroplanes having other properties than those of the aeroplanes presently used.

The water around a ship at rest is in a hydrostatic equilibrium. The water pressure is equal to an energetic potential: $Pa=Nm^{-2}=Jm^{-3}$. The static pressure at a given depth is constant. Any manipulation of static pressure in a fluid in the open must be indirect, by a change of the dynamical pressure. Technically, this takes place by introducing streams of water. In aeroplanes and airships, streams of air are used.

A stream or streams close to the vessel will disturb the equilibrium by reducing the local static presssure to a level calculable by Bernoulli's equation. This is equivalent to reducing the local force over the part of the surface of the vessel flushed by the streams, thus releasing the local potential of the adjacent fluid.

In combination with the undisturbed pressure on the opposite side of the vessel, sustained streams will produce a differential of pressure relative to the potential. This differential will release its potential by imparting a momentum to the vessel.

This hydrodynamically produced momentum is directed normally to the direction of the streams. It is useful for lift and propulsion.

When the body moves, the velocity over its opposite side, the one that is not flushed, will produce a reduced pressure and an accompanying force. As long as this pressure reduction is not as great as the ambient pressure, there will be a net force pushing the body.

The system here described is a simple apparatus which produces a technical effect by producing a pressure differential in the ambient fluid of a vessel, thus releasing a part of its potential and malting it useful for lift or propulsion. It is not possible to refer to any published empirical or theoretical foundation for a calculation of its distribution of energy in the fluid, its forces, or its effects. Among the references are works having a general relevance for hydrodynamical technology (4, 7). Other relevant information will be found in textbooks of advanced studies, e.g. marine hydrodynamics, rotating machines and thermodynamics.

I. Special.

The present invention relates to a method and system for producing a pressure differential over a body by actively flushing one or more sides of the body, thereby establishing a low pressure region. The pressure differential is thus created between the low pressure region and the opposite side of the body.

From the apparatus described in ref. 5 it is not possible to derive the system described here. This is derived indirectly from what is seen to be principles of fluid mechanics at work in current technology, like aeroplane wings, propellers, pumps, and turbines. To the principles observed have been added the distinctive traits of rotatable tubes and close flushing.

The effect of the flushing is a reduced pressure over a surface. In conjunction with the pressure over the opposite side of the body, this exposes it to a force, useful for lift. A sustained flushing produces a momentum, useful for propulsion and manceuvering. As seen above, this method is better than reactive devices for producing a force.

The air velocity difference over an aeroplane wing is 5-10 per cent. As long as the aeroplane velocity is above a threshold, the hydrodynamical potential of the velocity difference over the aeroplane wing will, as shown above, be more power efficient for producing lift than a reactive force can be.

A technically produced stream according to the method presented here will have its velocity limited to that of sound, even for rather slow aeroplanes. Thus, it will be possible to produce a greater specific lift. Within this constraint, the lifting force will depend upon the power used and will permit competitive velocities of aeroplanes.

By inclining the lifting body forward, it is used for propulsion and lift simultaneously. As the efficiency of jet engines is not remarkably high, propulsion by the horizontal vector of an inclined, flushed, lifting body will be more efficient. This will permit slow and low-going aeroplanes. The advantages of manceuvering by longitudinally and transversally inclinable bodies will be great, combining the versatility of the helicopter with the smaller engine installation needed for hydrodynamical lift and propulsion.

Friction and viscous resistance over the immersed surface are present at every contact between streams and surfaces, so are inavoidable in vessels.

Two other components of resistance are seen at towing a ship: an elevated pressure fore and a reduced pressure aft. By the use of a propeller, which draws water before accelerating it through its disk, the pressure around the stem is even more reduced, producing a force against the forward motion of the ship. Ahead, the bow wave signals an increased pressure, which is the energy needed in order to remove the water from the course of the ship.

These two components, the bow wave and the thrust deduction fraction, are currently seen as dynamical resistance bound to the propulsion of ships. Together, they consume 30-45 per cent of the shaft power in most ships (2, 6).

They may as well be seen as generic technical losses induced by the propeller. Except a part of the reduced pressure aft, they are not bound to ship's propulsion as such.

The present state of ships' propulsion is one of suboptimization, as the use of the reactive force of a propeller confers a series of constraints to the form and performance of ships. These are taken to be the conditions of ships' propulsion as such, cf. the relevant literature, e.g. ref. 2 and 6. The models for calculating power, velocity, and propellers' presumed optimal properties, are empirical and have a tenuous connection to physics. In order to predict the performance of a ship, a model of it is tried; and it has to be of a certain size in order for the impreciseness of the scaling factors to be overcome.

The propeller itself is a suboptimal reaction apparatus. On the basis of physical functions, it has been possible to design an optimal propeller (9). It will not, however, reduce the two components of resistance bound to reactive propulsion.

The same relation as for aeroplanes between power applied and momentum (or first moment of mass) produced is valid for any body moved in a fluid or held against the acceleration of gravity. The hydrodynamically produced force is more power efficient than a reactive force; and it puts fewer constraints on design and performance of the vessels.

For ships, the pressure differential generating stream will have a velocity of more than twice the velocity of the ship. By flushing the bow, the force generated by the pressure differential between it and the longitudinal projection of the after ship will be higher than that obtainable by a propeller, since the surfaces involved are greater. This moving force is produced without an inherent loss of efficiency like that of a propeller, cf. the turbulence of the propeller race.

By this technique, the ship is made into its own propulsive contrivance.

A known way of producing streams over a ship's bow is to use nozzles (3). A technically more efficient way is to place the nozzles in the walls of two pressure vessels formed like tubes at or near the stagnation line of the surface of the body over which the pressure is to be reduced. By the use of a string of nozzles in each tube, the streaming fluid is distributed over this surface. By malting the tubes rotatable, the reactive force of the streams will be useful for braking and steering, which can be performed simultaneously. Braking will be possible even with large vessels.

On seagoing vessels, the two tubes are placed on the middle of the bow so as to distribute the streams over its curved surfaces, as it is formed like one vertical, circular semi-cylinder or like two vertical semi-cylinders having an adequate cut for the purpose of the ship. The position of tubes defines the leading edge of these two section surfaces. The aft longitudinal projection of the ship defines the pressure side.

The tubes are protected by a vertical body ahead so that the stream diverted by it will meet the bow at or near the lines where the flushing streams meet the bow.

Ships and ferries with a need for precise manceuvering will have their stern formed like the bow. Tubes with nozzles are fitted correspondingly. Braking is performed by rotating the tubes ahead 90° or by flushing aft.

On aeroplanes, curved surfaces or movable bodies with one curved surface are flushed with air streams from tubes placed near their stagnation lines. In order to prevent the meeting stream from following the pressure side of a movable body, a plate is hinged to its leading edge and prevented from fluttering by the aid of shock absorbers.

The force generated by the pressure differential is useful for lift, propulsion, and manceuvering. On aeroplanes, the last two are obtained by inclining the hinged bodies axially and transversally, thus using both the vertical and the horizontal components of the vector of the potential.

A ship may be interpreted as two wings put together, so that their suction sides form the bow and the sides of the ship, cf. the drawing. The part of a ship corresponding to the pressure side of a wing will be the aft longitudinal projection of the ship.

This method will bring a series of advantages:

Aeroplanes can be made small, with a fuller body, and nearly noiseless.

The transversal forces of a ship or an aeroplane will be considerably greater than those obtainable by a rudder, making possible an efficient steering.

Aeroplanes will be made to hover, brake in the air, fly in narrow curves, turn on the spot, fly sideways, and land or take off vertically from a small ground. The aeroplane will easily be kept in an upright position.

The need for power will be considerably lower than in helicopters.

In a ship, the efficiency of sideways translation in combination with or independent of longitudinal movement will be higher than that of transversally working propellers, as it may be performed by the whole power of the prime mover.

With nozzles fore and aft, it will be possible to translate the whole ship sideways (sway) and to rotate it on the spot (yaw).

A precise steering will make easier the passage of rivers, straits, and canals. It will be possible to follow a precise course without pushing the stern out the way it is by the use of a rudder. Coasters will be able to maneuver without swaying and to go fast even in narrow waters.

Since the bow wave will be insignificant, there will be a low wash, making possible the passage of rivers, straits, and canals at higher speeds without damage to shores or small craft.

The system may be used on full ships, which will have a smaller wetted surface and a smaller steel weight relative to their volume. It will be possible to use form coefficients that are inapplicable today. It will also be possible to design a ship of smaller draught relative to its deck area or to its volume and dead weight.

With diesel-electrical propulsion or fuel cells, an optimal use of a ship's volume will be possible.

The system is built on known technology. Centrifugal pumps are used at sea, thus water nozzles are the only new part of the propulsion system. Removing of particles from pump circuits is routine at sea. The system will be easily maintained.

There will be no risk of overloading motor or pump.

The system renders a high degree of security. Tubes and nozzles are less easily damaged than propellers are, as they are not protruding nor moving appendages.

It will be possible to isolate engines and pumps from the hull. This will impede the propagation of motor noise and vibrations in the ship.

There will be no vibrations like those generated in the stern by the pressure differences from the propeller. The nozzles will not generate any low-frequency energy, but produce high-frequency sound only, which is of short range, as it is quickly damped in water.

It will be possible to reduce the quay erosion which is sometimes a problem in the ferry trade, as its possible to brake aft on arriving at the quay. At departure, the double-ended ferry is flushed at the fore end.

Since most ferry quays are open on one side, the use of catamarans will be possible. These will have an advantageous relation between displacement, draught, capacity, and speed. Two bow gates in each end will make possible the use of existing ferry quays.

Submarines may be directed downwards along a steeper angle than that now possible by the horizontal rudder alone.

REFERENCES

Daniel Bernoulli: *Hydrodynamica,* 1738.
Sv. Aa. Harvald: *Resistance and Propulsion of Ships*, John Wiley & Sons, New York, 1983.
Arne Kristiansen: Norwegian application for patent n° 19905214.
B. S. Massey: *Mechanics of fluids,* $2^{nd}$ edition, Van Nostrand Reinhold, London, 1970.
T. Mehus: *An experimental investigation into the shape of thrust-augmenting surfaces in conjunction with Coanda-deflected jet sheets*, University of Toronto, 1965.
Harald Walderhaug *Motstand og frarndrift*, Institutt for marin hydrodynamikk, 1988.
S. W. Yuan: *Foundations of fluid mechanics,* $2^{nd}$ edition, Prentice-Hall International, London, 1970.
Jan Inge Eielsen, Fluma A S: Norwegian patent n° 305796.
Arne Kristiansen: Norwegian patent n° 143093.

The invention claimed is:

1. A method for propelling and maneuvering a body having a curved leading edge through a fluid, comprising the steps of:
    a) providing one or more nozzles that eject one or more streams of pressurized fluid
    b) directing the pressurized stream or streams that exit from the one or more nozzles towards the surface of the body at the leading edge, at an angle and velocity sufficient to generate a pressure potential between the leading edge and trailing edge, the pressure potential being of a magnitude sufficient to impart movement of the body through the fluid.

2. The method of claim 1, wherein a plurality of nozzles are integrated in a rotatable cylinder mounted to the leading edge of the body.

3. The method of claim 2, wherein the body is a seagoing vessel, the fluid is water, and the curved leading edge is the bow of the vessel.

4. The method of claim 3, wherein the nozzles are arranged to eject a plurality of pressurized streams directly against the surface of each side of the vessel at a point at the immediate vicinity of the front of the bow.

5. The method of claim 3, wherein the angle of the pressurized streams may be selectively adjusted in order to propel, steer and brake the vessel.

\* \* \* \* \*